US012664725B2

(12) United States Patent
Kim et al.

(10) Patent No.: US 12,664,725 B2
(45) Date of Patent: Jun. 23, 2026

(54) METHODS AND SYSTEMS FOR GENERATING A MULTI-DIMENSIONAL IMAGE USING CROSS-VIEW CORRESPONDENCES

(71) Applicant: Lemon Inc., Grand Cayman (KY)

(72) Inventors: Seung Wook Kim, Los Angeles, CA (US); Peng Wang, Los Angeles, CA (US); Kejie Li, Los Angeles, CA (US); Xueqing Deng, Los Angeles, CA (US); Yichun Shi, Los Angeles, CA (US)

( * ) Notice: Subject to any disclaimer, the term of this patent is extended or adjusted under 35 U.S.C. 154(b) by 208 days.

(21) Appl. No.: 18/418,215

(22) Filed: Jan. 20, 2024

(65) Prior Publication Data

US 2025/0239005 A1      Jul. 24, 2025

(51) Int. Cl.
*G06T 17/00*       (2006.01)
*G06F 40/40*       (2020.01)
*G06T 3/4007*      (2024.01)
*G06T 7/73*        (2017.01)
*G06T 15/10*       (2011.01)

(52) U.S. Cl.
CPC .............. *G06T 17/00* (2013.01); *G06F 40/40* (2020.01); *G06T 3/4007* (2013.01); *G06T 7/75* (2017.01); *G06T 15/10* (2013.01); *G06T 2200/04* (2013.01)

(58) Field of Classification Search
CPC ......... G06T 17/00; G06T 3/4007; G06T 7/75; G06T 15/10; G06T 2200/04; G06F 40/40
See application file for complete search history.

(56) References Cited

U.S. PATENT DOCUMENTS

2023/0260084 A1*   8/2023   Li ........................ G06N 3/0475

OTHER PUBLICATIONS

Long et al., "Wonder3D: Single Image to 3D using Cross-Domain Diffusion," arXiv:2310.15008v3 (Nov. 8, 2023).
Shi et al., "MVDream: Multi-View Diffusion for 3D Generation," arXiv:2308.16512v2 (Oct. 2, 2023).
He et al., "Text-Image Conditioned Diffusion for Consistent Text-to-3D Generation," CoRR, arXiv:2312.11774v1, submitted on Dec. 2023, 13 pages.
International Search Report in International Appln. No. PCT/SG2024/050823, mailed on Feb. 4, 2025, 2 pages.
Tang et al., "MVDiffusion: Enabling Holistic Multi-view Image Generation with Correspondence-Aware Diffusion," CoRR, arXiv:2307.01097v7, submitted on Dec. 2023, 32 pages.
Xu et al., "3DiffTection: 3D Object Detection with Geometry-Aware Diffusion Features," CoRR, arXiv:2311.04391v1, submitted on Nov. 2023, 17 pages.

* cited by examiner

*Primary Examiner* — Haixia Du
(74) *Attorney, Agent, or Firm* — Fish & Richardson P.C.

(57)           ABSTRACT
Methods and systems for generating a three-dimensional (3D) image using one or more diffusion models. The method includes obtaining input data into at least one diffusion model, in which the input data includes a prompt for generating the 3D image and generating at least two sets of two-dimensional (2D) images from a 3D representational model that is configured to render the 3D image. The method further includes determining a correspondence loss between reprojected points from the 3D representational model and cross-view correspondences from the at least one diffusion model and updating the 3D representational model based on the correspondence loss.

17 Claims, 4 Drawing Sheets

METHODS AND SYSTEMS FOR GENERATING A MULTI-DIMENSIONAL IMAGE USING CROSS-VIEW CORRESPONDENCES

FIELD

The embodiments described herein pertain generally to multi-dimensional image synthesis in computer vision, imaging, and graphics. More specifically, the embodiments described herein pertain to generating multi-dimensional images using cross-view correspondences to enhance the multi-dimensional fidelity in the multi-dimensional image.

BACKGROUND

A text-to-image model is a machine learning model that may be used to receive a natural language description (e.g., text) as an input and generate an image that matches the description. Some text-to-image models may be used to generate collages of images by arranging existing component images from e.g., a database of clip art. Some text-to-image models may be able to generate more complex images such as compositions based on the input text (e.g., "an astronaut riding a horse"). Some text-to-image models may be used for three-dimensional (3D) generation that may have applicability in areas such as virtual reality and 3D content generation for gaming, media, alternate reality (AR), or the like.

In some text-to-image models, a two-dimensional (2D) diffusion model may be used to generate 2D images as priors to optimize 3D representations, such as, as used in neural radiance field (NeRF) or neural surface reconstruction (NeuS). Single-view 2D diffusion priors, however, suffer from multi-view inconsistency, e.g., lack multi-view knowledge and 3D awareness, such that the text-to-image models may result in inconsistencies in the 3D image, e.g., namely, the Janus face problem and content drift.

SUMMARY

Features in the embodiments disclosed herein provide a text-to-multi-dimensional generative model that may generate multi-dimensional images, e.g., three-dimensional images or scenes, with multi-dimensional image fidelity using cross-view correspondences. In some embodiments, the cross-view correspondences may be computed using one or more diffusion models and that may function as the optimization prior. In some embodiments, one or more features, e.g., feature maps or feature sets, determined from the diffusion model(s), such as, features determined from one or more up-sampling layers, may be used to establish the correspondences between multi-view images without explicit supervision or fine-tuning. Furthermore, by using known parameters, e.g., such as camera poses, depth, or the like, from a multi-dimensional representational model, the model may be designed, programmed, or otherwise configured to reproject pixels across different image views using rendered depth values, e.g., if the MD representational model is a NeRF model, then the depth values may be NeRF-rendered depth values to reproject a pixel position in different image views, e.g., reprojected correspondences. As such, the reprojected correspondences, e.g., reprojections of the pixels, may be aligned to the cross-view correspondences, e.g., between the multi-view image(s) and the reprojected pixel(s). In some embodiments, a cross-view correspondence loss may be minimized between the rendered multi-view images and the reprojected pixel(s), to enhance the image fidelity of the output image, e.g., by correcting or updating parameters in the MD representational model, such as, the depth parameters, until the reprojected pixel(s) correspond to the cross-view correspondences in the rendered multi-view images.

In one example embodiment, a method for generating a three-dimensional (3D) image using one or more diffusion models is provided. The method includes obtaining input data into at least one diffusion model, in which the input data includes a prompt for generating the 3D image; generating at least two sets of two-dimensional (2D) images from a 3D representational model that is configured to render the 3D image; determining a correspondence loss between reprojected points from the 3D representational model and cross-view correspondences from the at least one diffusion model; and updating the 3D representational model based on the correspondence loss.

In another example embodiment, a three-dimensional (3D) image generator is provided. The image generator in includes at least one diffusion model for generating one or more images based on received input data; and a 3D representational model for rendering a 3D image from the one or more images from the at least one diffusion model. The 3D representational model is configured to generate at least two sets of two-dimensional (2D) images of the 3D image, and the 3D representational model is updated based on a correspondence loss, in which the correspondence loss is determined between reprojected points from the 3D representational model and cross-view correspondences from the at least one diffusion model.

In yet another example embodiment, a method for increasing image fidelity in a multi-dimensional (MD) image using one or more diffusion models is provided. The method includes generating at least two sets of images based on a MD representational model that is configured to render the MD image; determining cross-view correspondences between adjacent views in image pairs from the at least two sets of images using at least one diffusion model; and updating parameters in the MD representational model based on the cross-view correspondence.

In still yet another example embodiment, a non-transitory computer-readable medium having computer-executable instructions stored thereon that, upon execution, cause one or more processors to perform operations including obtaining input data into at least one diffusion model, in which the input data includes a prompt for generating the 3D image; generating at least two sets of two-dimensional (2D) images from a 3D representational model that is configured to render the 3D image; determining a correspondence loss between reprojected points from the 3D representational model and cross-view correspondences from the at least one diffusion model; and updating the 3D representational model based on the correspondence loss.

The text-to-multi-dimensional generative model disclosed herein may, thus, support several downstream applications, including, but not limited to, MD image generation, such as, generating 3D images and/or scenes, that may be used in gaming applications, social networking applications, augmented and/or virtual reality applications, or the like.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

Figure 1:
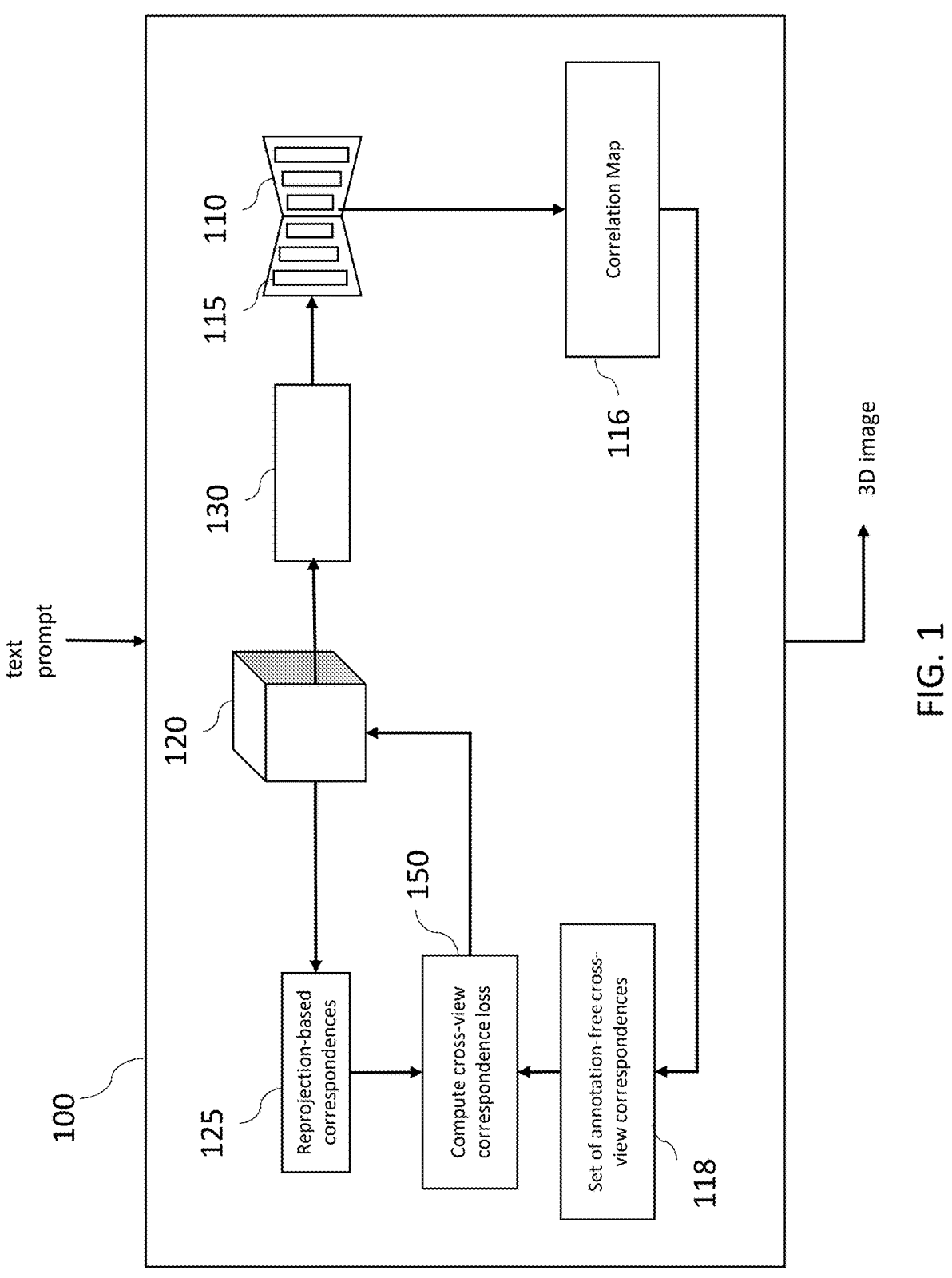
FIG. 1 illustrates an example three-dimensional model for generating three-dimensional images that may be implemented, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, "text-to-image model" or "text-to-image generative model" may refer to a machine learning model that may be used to receive a natural language description (e.g., text prompt) as input data and produce an image that matches the natural language description. It is to be understood that a text-to-image model typically includes a language model (which may be used to transform the received text input into a latent representation) and a generative image model (which may be used to produce an image conditioned on that latent representation). It is also to be understood that in the field of artificial intelligence and/or machine learning, training a text-to-image model typically requires a dataset of images that are paired with one or more text captions. It is further to be understood that "pre-trained" may indicate that a machine learning model has been trained and the corresponding training checkpoint has been used. A "pre-trained" text-to-image model may refer to a text-to-image model that has been trained on sufficient image and text data e.g., scraped from the web, a database, the cloud, etc.

As referenced herein, "diffusion model" or "diffusion-based model" in machine learning may refer to a diffusion probabilistic model and/or a latent variable model. It is to be understood that diffusion models are designed to learn the latent structure of a dataset by modeling the way in which data points diffuse through the latent space. For example, in computer vision, diffusion models include a neural network that is trained to de-noise images blurred with Gaussian noise to reverse the diffusion process. It is also to be understood that diffusion models may be applied to a variety of tasks, including image de-noising, in-painting, super-resolution, image generation, etc. For example, utilization of an image generation diffusion model may start with a random noise image and then, after having been trained to reverse the diffusion process performed on natural images, the diffusion model may be implemented to generate new natural images. It is further to be understood that given an image ("$x_0$") randomly sampled from a real data distribution, there can be two processes in a diffusion model: (1) a forward process (or referred to as a diffusing process, a diffusion process, etc.) that repeatedly adds Gaussian noise to the sample to generate a diffused sample so that the sample gradually becomes Gaussian noise after a certain amount (e.g., the number T) of operations or iterations ($x_0 \rightarrow x_T$), and (2) a reverse process (or referred to as a de-noising process, etc.) that repeatedly de-noises given a Gaussian noise input (e.g., the diffused sample, etc.) to generate a de-noised output ($x_T \rightarrow x_0$).

It is to be understood that a diffusion process may be a continuous-time Markov process with continuous sample paths. The diffusion process may corrupt a sample (e.g., an image, etc.) by adding noise, e.g., Gaussian noise, to the sample. As referenced herein, "Gaussian noise" may denote a type of signal noise that has a probability density function equal to that of the normal distribution (also known as the Gaussian distribution). It is also to be understood that a de-noising process (or noise reduction process) may be a process of removing noise from a sample. It is further to be understood that in some example embodiments, the de-noising process may distort the sample to a certain degree. As such, in some embodiments, the diffusion models may be designed to predict at least one noise component to generate the new or natural images.

It is to be understood that "pre-trained text-to-image diffusion-based generative model" may refer to a pre-trained (described above), diffusion-based (having a diffusing process and a de-noising process from a diffusion model, described above), text-to-image generative model (described above). In an example embodiment, a text-to-image diffusion-based generative models may refer to a diffusion-based generative model that accepts a text prompt input and synthesizes an image matching the text prompt input. It will be appreciated that a machine learning model, such as a text-to-image diffusion-based generative model, may transform an input text prompt into a latent representation to produce an image condition on that latent representation, e.g., three-dimensional image and/or scene.

As referenced herein, "conditioning input" or "conditioning" or "conditioner" may refer to the input on which an operation of a process of the machine learning model is conditioned (e.g., to generate an output consistent with the conditioner). In the embodiments described and recited herein, "conditioning input," "conditioning," and "conditioner" may be used interchangeably without deviating from the intended meaning and/or scope. It is to be understood that a text prompt may be a conditioner for a text-to-image model to generate an image that is semantically consistent with the text prompt e.g., by optimizing the latent vector or the generator to maximize the similarity between the text prompt and the image. That is, the text-to-image model may generate an image conditioned on or consistent with the conditioner (e.g., a text prompt).

As referenced herein, "camera pose" may refer to the position and orientation of a camera in a coordinate system, with respect to six degrees of freedom, using different representations, e.g., a transformation matrix. It is to be appreciated that the six degrees of freedom may be grouped into two categories: translations and rotations. Translations are linear, horizontal straightness, and vertical straightness. Rotations are pitch, yaw, and roll. Camera pose may include the estimation of objects' poses in scenes or scenarios for the camera. In an example, embodiment, camera pose may be estimated from training images from an image dataset, e.g., using a camera pose estimator.

As referenced herein, "rendering" or "neural rendering" may refer to a class of deep image and video generation approaches that enable explicit or implicit control of scene properties such as illumination or lighting, camera parameters, pose, geometry, appearance, shapes, semantic structure, etc. It is to be understood that "rendering" or "neural rendering" may refer to a method, based on deep neural networks and physics engines, which can create novel images and video footage based on existing scenes. It is also to be understood that the functions of "rendering" or "neural rendering" may be implemented by a "renderer" or "neural renderer".

As referenced herein, "up-sample" or "up-sampling" may refer to an image-editing action or process that enlarges the original image, making up (or interpolating) additional pixels to fill in the gaps. "Up-sampling" may refer to the increasing of the spatial resolution while keeping the two-dimensional representation of an image. It is to be understood that up-sampling may be used for zooming in on a small region of an image, and for eliminating the pixelation effect that arises when a low-resolution image is displayed on a relatively large frame.

As referenced herein, a model, module, or framework may refer to software, i.e., algorithms and/or programs, hardware or firmware, or any combination thereof that supports machine learning, natural language understanding, natural language processing, speech recognition, computer vision, etc.

Features in the embodiments disclosed herein provide a text-to-multi-dimensional generative model that may generate multi-dimensional images, e.g., three-dimensional images or scenes, with multi-dimensional image fidelity using cross-view correspondences. In some embodiments, the cross-view correspondences may be computed using one or more diffusion models and that may function as the optimization prior. In some embodiments, one or more features, e.g., feature maps or feature sets, determined from the diffusion model(s), such as, features determined from one or more up-sampling layers, may be used to establish the correspondences between multi-view images without explicit supervision or fine-tuning. Furthermore, by using known parameters, e.g., such as camera poses, depth, or the like, from a multi-dimensional representational model, the model may be designed, programmed, or otherwise configured to reproject pixels across different image views using rendered depth values, e.g., if the MD representational model is a NeRF model, then the depth values may be NeRF-rendered depth values to reproject a pixel position in different image views, e.g., reprojected correspondences. As such, the reprojected correspondences, e.g., reprojections of the pixels, may be aligned to the cross-view correspondences, e.g., between the multi-view image(s) and the reprojected pixel(s). In some embodiments, a cross-view correspondence loss may be minimized between the rendered multi-view images and the reprojected pixel(s), to enhance the image fidelity of the output image, e.g., by correcting or updating parameters in the MD representational model, such as, the depth parameters, until the reprojected pixel(s) correspond to the cross-view correspondences in the rendered multi-view images.

As discussed herein, while not intending to limit the scope of the disclosure, the multi-dimensional generative model may be a three-dimensional model for generating a three-dimensional image. The "multi-dimensional" nature of the model, however, may also include additional dimensions, for example, time, in which the cross-view correspondence process may be used to condition and/or tune a multi-dimensional representational model. For sake of clarity, the multi-dimensional generative model is described below as a three-dimensional model and the multi-dimensional image is described below as a three-dimensional image.

FIG. 1 illustrates a multi-dimensional (MD) generator model 100 for generating a MD image, in accordance with at least some embodiments described herein. The MD image may be a multi-dimensional image, such as, a 3D image along XYZ coordinates, a 3D image with a time component, a 3D image with a channel component, a 4D image, or the like. For sake of clarity, the MD generator model 100 will be discussed herein as a 3D generator model for generating a 3D image or scene. The methods and systems discussed herein may be used for providing image fidelity in a rendered 3D image by sampling one or more images from a pre-trained multi-view diffusion model and using the cross-view correspondence as priors to supervise the 3D generator model, e.g., by comparing reprojected pixels or points, e.g., reprojected correspondence, to the cross-view correspondences. As used herein, the term "reproject" or "reprojected" may refer to using depth information provided by the 3D rendering process alongside the known camera parameters to reproject points or pixels from one view of the corresponding points in the adjacent view.

The 3D generator model 100 may include one or more diffusion models 110, a 3D representational model 120, a pixel reprojection module 125, a correlation computation module 118, and cross-view correspondence loss module 150. In an example embodiment, the 3D generator model 100 (and/or the components therein) may be a function, an operation, an action, an algorithm, an application, or the like that is implemented, designed, stored, executed, performed, or otherwise hosted in an electronic device (e.g., 400 of FIG. 4, etc.) such as a graphics processing unit ("GPU"), central processing unit ("CPU"), or other processor-enabled device, which may be a cloud-based network, a local device, or downloaded to the local device, a server, a smartphone, a tablet computer, a laptop computer, a desk computer, and/or any other suitable electronic device. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof.

The one or more diffusion models 110 may be text-to-image models that may be designed, programmed, or otherwise configured to receive input data, e.g., a text prompt, and generate an output image, e.g., one or more 2D images based on the text prompt. In some embodiments, the one or more diffusion models 110 may be multi-view diffusion models that generates multiple views of the output image, e.g., adjacent 2D views of a 3D image, which may be used for image rendering of the 3D image. The one or more diffusion models 110 may be pre-trained models that may be trained to de-noise images, e.g., blurred with Gaussian noise, to reverse the diffusion process. In some embodiments, noise may be added to the image(s) for processing by the one or more diffusion models 110. It is also to be understood that diffusion models may be applied to a variety of tasks, including image de-noising, in-painting, super-resolution, image generation, etc. That is, in some embodiments, the one or more diffusion models 110 may be a text-to-image multi-view diffusion-based generative models that accepts a text input and synthesizes an image, e.g., multiple views of images for 3D image rendering, matching the text input.

In some embodiments, one or more of the one or more diffusion models 110 may include one or more layers (or nodes) 115 for processing an image. In some embodiments, the one or more layers 115 may be up-sampling layers that may be designed, programmed, or otherwise configured for segmenting the image and/or generating feature maps of the images, e.g., via progressively lowering (e.g., halving) the feature map resolution and then increasing the resolution, e.g., up-sampling to image view resolutions, for example, using a U-Net architecture. In some embodiments, the one or more diffusion models 110 may include 4, 8, 12, or 16 up-sampling layers for processing the image(s). In some embodiments, the one or more diffusion models 110 may include a primary backbone network that may include an encoder, a decoder, and skip connections for transferring information between corresponding one or more layers 115 that may be provided in the encoder and/or decoder.

The 3D representational model 120 may be designed, programmed, or otherwise configured to reconstruct (or render) 3D representations from the images from the one or more diffusion models 110, e.g., neural rendering of the multi-view images to the 3D image. The 3D representational model 120 may include a neural network, deep neural network, multilayer perceptrons (MLPs), or the like for encoding the 3D representation. In some embodiments, the 3D representational model 120 may generate and/or render the resulting 3D image by sampling one or more points along one or more rays, e.g., from multiple viewing directions, and use neural rendering for generating the 3D image. The 3D representational model 120 may include parameters, such as, depths, camera poses, surfaces, or the like, that may be tuned or fine-tuned to enhance, improve, or increase the image fidelity of the rendered 3D image along various depths of the 3D image. The 3D representational model 120 may be a neural field radiance (NeRF) model, a neural surface reconstruction (NeuS) model, or the like.

The pixel reprojection module 125 may be designed, programmed, or otherwise configured to leverage depth information provided by the 3D representational model 120 along with known camera parameters, e.g., pose or position, to reproject points from one view to corresponding points in any adjacent view(s) through a reprojection function denoted as $\pi$. That is, the pixel reprojection module 125 is configured to reproject pixels across different image views using rendered depth values, e.g., NeRF-rendered depth values, to reproject a pixel position in different image views, e.g., the 3D representational model 120 is used to render different views/depths, which may have 3D image infidelities. As such, the reprojections of the pixels may be aligned, e.g., reprojected correspondences, to the cross-view correspondences, e.g., between the multi-view image(s) and the reprojected pixel(s), for example, by minimizing a cross-view correspondence loss between the multi-view images and the reprojected pixel(s), to enhance the image fidelity of the output image, e.g., by correcting or updating parameters in the 3D representational model 120, such as, depth parameters.

The correlation computation module 118 may be designed, programmed, or otherwise configured to compute cross-view correspondences between each image pair of adjacent views from image sets generated or rendered from the 3D representational model 120, yielding N sets of adjacent-view correspondences. In some embodiments, N may be between 2 and 256 or more, for example, 4 sets of adjacent-view correspondences, e.g., image pairs, or the like. In some embodiments, the cross-view correspondences may be determined from correlation map(s) 116 generated from the one or more diffusion models 110, in which the cross-view correspondences may be extracted, annotation-free corresponding points in each image pair of adjacent views. The correlation computation module 118 may be configured to provide post-processing of the correlation map(s) 116 to result in better correspondences between pixels and/or points in the image pairs without any training.

The cross-view correspondence loss module 150 may be designed, programmed, or otherwise configured to determine a correspondence loss between reprojected points from the 3D representational model 120 with the cross-view correspondences from the at least one diffusion model determined by the correlation computation module 118 for supervising the 3D representational model 120. The cross-view correspondence loss module 150 may include an algorithm to determine the cross-view correspondence loss, which penalizes the reprojected correspondences, e.g., pixels or points, from the 3D representational model 120 when they diverge from the diffusion feature cross-view correspondences, e.g., when they are incoherent to common sense. That is, in some embodiments, since the pixel reprojections from the 3D representational model 120 may be incorrect, the cross-view correspondences may be used to correct the 3D representational model 120 parameters, e.g., depth parameter.

Operation of the 3D generator model 100 is discussed further below, in which the 3D generator model 100 may have improvements to the 3D image fidelity by using cross-view correspondences derived from the multi-view diffusion models 110 that are used as priors for the 3D image generation/rendering.

Initially, input data, such as a text prompt, e.g., "corgi wearing regalia," may be provided to the 3D generator model 100 and/or to one or more of the diffusion models 110 to generate an output image. In some embodiments, the one or more diffusion models 110 may be pre-trained multi-view diffusion models that are designed, programmed, or otherwise configured to generate multiple 2D views, e.g., at various camera angles in a 3D space, for the resulting image (or scene) from the text prompt, in which the multiple 2D views may be used for rendering the 3D image, e.g., pre-trained multi-view diffusion models to generate a scene of the image corresponding to the text prompt. The 3D representational model 120 may be designed, programmed, or otherwise configured to then generate and/or render the 3D image from the multiple views generated by the one or more diffusion models 110, e.g., using neural rendering and/or volumetric rendering functions.

In order to improve the 3D image fidelity of the resulting 3D image, the 3D representational model 120 may be optimized, e.g., by correcting or updating parameters in the 3D representational model 120, using one or more loss functions based on the resultants from the diffusion models 110. In one embodiment, the 3D representational model 120 may use the cross-view correspondence loss as supervision, in which the cross-view correspondence loss may be used to penalize any disparity between reprojected correspondences, e.g., pixels or points, from the 3D representational model 120, e.g., computed from depths and camera pose, when they diverge from the diffusion feature cross-view correspondences, e.g., when they are incoherent to common sense. That is, in some embodiments, the cross-view correspondences may be used as pseudo-ground truth correspondences, e.g., correspondences that are consistent with human perception and adheres to common sense for image rendering, for comparing to the reprojected pixels or points.

For example, in an embodiment, the 3D representational model 120 may be used to generate and/or render at least two sets of 2D images 130 that have adjacently rendered views, e.g., corresponding points in the images in the two sets of images, e.g., from different camera views or poses (or viewing angles). The 2D images may have any variety of pixel sizes, such as, 32×32, 64×64, 128×128, 256×256, or the like.

The two sets of generated and/or rendered images from the 3D representational model 120 may be processed by the one or more diffusion models 110 to determine any cross-view correspondences between image pairs. In an embodiment, the one or more diffusion models 110 may include one or more layers 115 that may be up-sampling layers that may be designed, programmed, or otherwise configured for segmenting the image and/or generating feature maps of the images, e.g., via progressively lowering (e.g., halving) the feature map resolution and then increasing the resolution, for example, using the U-Net architecture. During the up-sampling (and/or during the subsequent down-sampling) of the images to image view resolutions, the diffusion models 110 may be configured to extract intermediate features from multiple layers of the one or more layers 115 to generate feature maps from the one or more layers 115 that may possess varying spatial dimensions across one or more layers 115. In some embodiments, the one or more diffusion models 110 may be frozen, such that the parameters of the one or more diffusion models 110 are not altered, updated, or changed during the supervision of the 3D representational model 120, e.g., to act as a critic for the reprojected points, e.g., to provide pseudo-ground truth data.

In some embodiments, the 3D generator model 100 may be configured to compute correlation map(s) at each feature level from the feature maps from the one or more layers 115 to encapsulate pairwise similarity across all spatial positions in the images from the at least two sets of images. The 3D generator model 100 may then aggregate the correlation maps from all feature levels to form a cumulative correspondence map for each view (in the 3D space).

In some embodiments, the cross-view correspondences may be post-processed to improve the cross-view correspondence determination. For example, in some embodiments, filtering out by opacity, a soft nearest neighbor filtering, 4D smoothing, using epipolar as a constraint, removing out-of-bound correspondence(s), and determining correspondence(s) by having a highest similarity value in the correlation map may be used to result in better correspondences between pixels and/or points in the image pairs without any training.

By having the dense correspondence field between each image pair, e.g., with adjacent views, the 3D generator model 100 may be configured to use the correspondence field as a 3D geometric prior to supervise the 3D representational model 120 to improve 3D image fidelity. For example, the correlation computation module 118 may compute cross-view correspondences from the correlation map 116 generated from the one or more diffusion models 110, in which the cross-view correspondences may be extracted, annotation-free corresponding points in each image pair of adjacent views. That is, annotation-free cross-view correspondences may be provided between each image pair of adjacent views from the image sets generated or rendered from the 3D representational model 120, yielding N sets of adjacent-view correspondences.

The annotation-free cross view correspondences may then be used by the cross-view correspondence loss module 150 to determine correspondence loss between reprojected points from the 3D representational model 120 with the cross-view correspondences from the correlation computation module 118 for supervising the 3D representational model 120. The cross-view correspondence loss module 150 may include an algorithm to determine the cross-view correspondence loss, which penalizes the reprojected correspondences, e.g., reprojections based on camera pose and depth, from the 3D representational model 120 when they diverge from the diffusion feature cross-view correspondences, e.g., when they are incoherent to common sense, e.g., the cross-view correspondences may be used as pseudo-ground truth data points. That is, since the ground-truth camera parameters may be a known parameter for each rendered view, e.g., via parameters provided by the 3D representational model 120, the reprojections of the pixels may be aligned to the cross-view correspondences, e.g., between the multi-view image(s) and the reprojected pixel(s), for example, by minimizing a cross-view correspondence loss between the multi-view images and the reprojected pixel(s), to enhance the image fidelity of the output image, e.g., by correcting or updating parameters in the 3D representational model 120, such as, depth parameters. As such, the resulting 3D image (or scene) from the text prompt may have improved 3D image fidelity, e.g., to surface textures, colors, concavities, quality, content drift, or the like, without requiring extensive training to the model(s).

Figure 2:
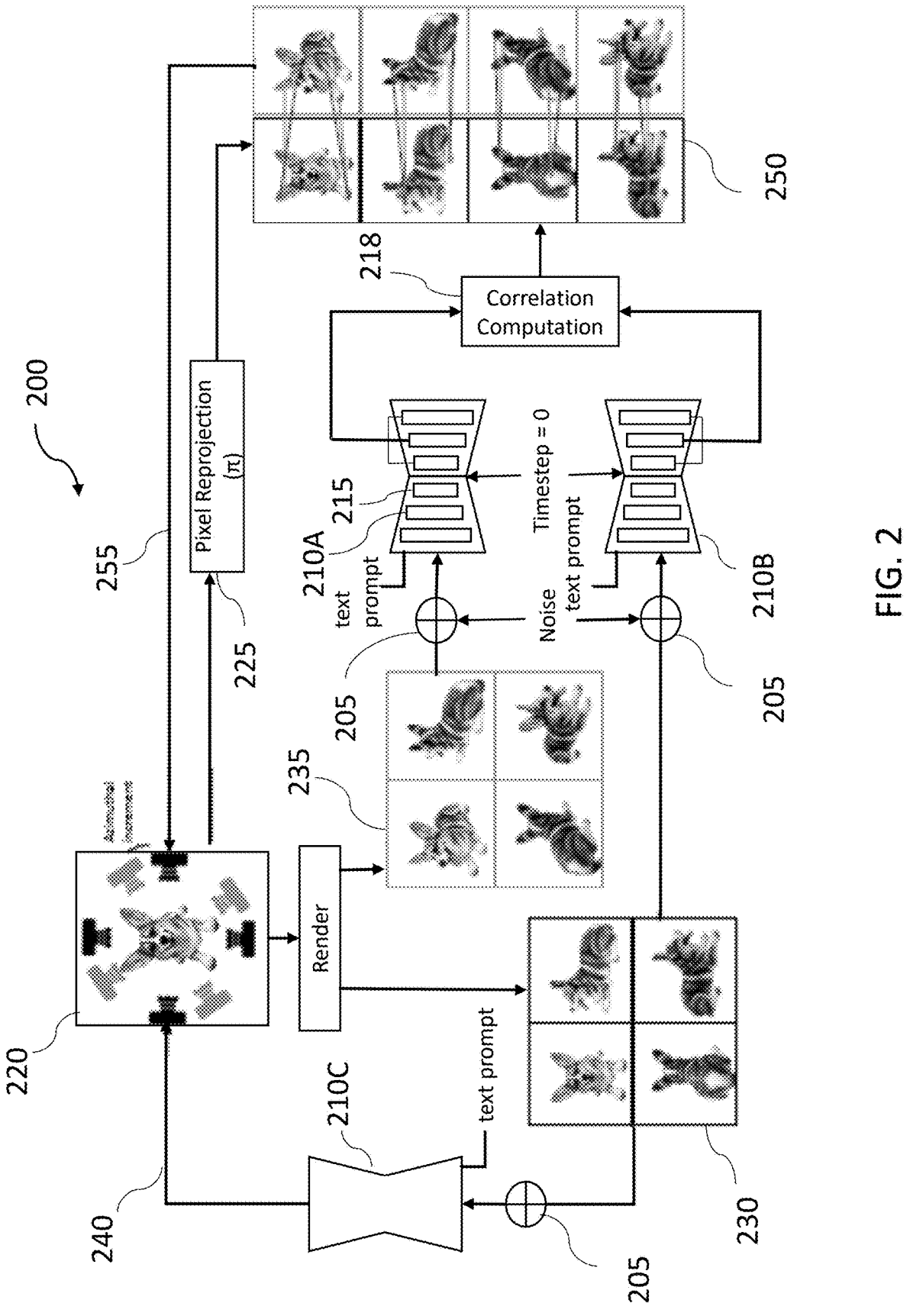
FIG. 2 illustrates another example of a three-dimensional model for generating three-dimensional images, arranged in accordance with at least some embodiments described herein.

FIG. 2 illustrates a three-dimensional (3D) generator model 200 for generating a 3D image, in accordance with at least some embodiments described herein. The 3D generator model may be the same and/or include the same or similar features as the MD generator model 100 of FIG. 1. The methods and systems discussed herein may be used for providing image fidelity in the rendered 3D image by sampling one or more images from a pre-trained multi-view diffusion model to determine cross-view correspondences that may be used as pseudo-ground truth data points for reprojected points or pixels from the 3D representational model.

The 3D generator model 200 may include one or more diffusion models 210A, 210B, 210C, a 3D representational model 220, a pixel reprojection module 225, a correlation computation module 218, and cross-view correspondence loss module 250. In an example embodiment, the 3D generator model 200 (and/or the components therein) may be a function, an operation, an action, an algorithm, an application, or the like that is implemented, designed, stored, executed, performed, or otherwise hosted in an electronic device (e.g., 400 of FIG. 4, etc.) such as a graphics processing unit ("GPU"), central processing unit ("CPU"), or other processor-enabled device, which may be a cloud-based network, a local device, or downloaded to the local device, a server, a smartphone, a tablet computer, a laptop computer, a desk computer, and/or any other suitable electronic device. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof.

The one or more diffusion models 210A, 210B, 210C may be text-to-image models that may be designed, programmed, or otherwise configured to receive input data, e.g., a text prompt, and generate an output image. In some embodiments, the one or more diffusion models 210A, 210B, 210C may be multi-view diffusion models that generates multiple views of the output image, e.g., adjacent 2D views of a 3D image, which may be used for image rendering of the 3D image. The one or more diffusion models 210A, 210B, 210C may be pre-trained models that may be trained to de-noise images, e.g., blurred with Gaussian noise, to reverse the diffusion process. In some embodiments, noise may be added to the image(s) for processing by the one or more diffusion models 210A, 210B, 210C. It is also to be understood that diffusion models may be applied to a variety of tasks, including image de-noising, in-painting, super-resolution, image generation, etc. That is, in some embodiments, the one or more diffusion models 210A, 210B, 210C may be a text-to-image multi-view diffusion-based generative models that accepts a text input and synthesizes an image, e.g., multiple views of images for 3D image rendering, matching the text input.

In some embodiments, the text prompt may be a single text or combination of texts. For example, in some embodiments, the text prompt may be "corgi wearing regalia," "cute steampunk elephant," "a chimpanzee with a big grin," "boy in Mohawk hairstyle, head only 4D, high definition (HD), raw," "an anthropomorphic tomato eating another tomato," or the like. The one or more diffusion models 210A, 210B, 210C may then be pre-trained to generate the corresponding multiple views of the image, e.g., multi-view 2D images for 3D image rendering.

It is appreciated that the one or more diffusion models 210A, 210B, 210C may be the same diffusion model or separate and independent diffusion models in the same network for processing and/or generating images. For sake of clarity, the one or more diffusion models 210A, 210B, 210C are discussed as being separate diffusion models for processing and/or generating images.

In some embodiments, one or more of the one or more diffusion models 210A, 210B, 210C may include one or more layers (or nodes) 215 for processing an image. In some embodiments, the one or more layers 215 may be up-sampling layers that may be designed, programmed, or otherwise configured for segmenting the image and/or generating feature maps of the images, e.g., via progressively lowering (e.g., halving) the feature map resolution and then increasing the resolution, for example, using the U-Net architecture. In some embodiments, the one or more diffusion models 210A, 210B, 210C may include a primary backbone network that may include an encoder, a decoder, and skip connections for transferring information between corresponding one or more layers 215 that may be provided in the encoder and/or decoder.

The 3D representational model 220 may be designed, programmed, or otherwise configured to reconstruct (or render) 3D representations from the 2D images from the one or more diffusion models 210A, 210B, 210C, e.g., neural rendering of the multi-view 2D images into a feature volume for the 3D image. The 3D representational model 220 may include a neural network, deep neural network, multilayer perceptrons (MLPs), or the like for encoding the 3D representation, e.g., as a volumetric function from the 2D images. For example, in some embodiments, the 3D representational model 220 may be a volumetric representational model that is designed, programmed, or otherwise configured to predict volume density and view-dependent emitted radiance given a spatial location and viewing direction of a camera, e.g., Euler angle. In some embodiments, the 3D representational model 220 may generate and/or render the resulting 3D image by sampling one or more points along camera rays, e.g., from the multiple viewing directions, and use volume rendering for generating the 3D image. In some embodiments, the 3D representational model 220 may be designed, programmed, or otherwise configured to render one or more views of the 3D image, e.g., at one or more camera angles, that may be processed by the one or more diffusion models 210A, 210B, 210C. The 3D representational model 220 may include parameters, such as, depths, camera poses, surfaces, or the like, that may be tuned or fine-tuned to enhance, improve, or increase the image fidelity of the rendered 3D image along various depths of the 3D image. The 3D representational model 220 may be a neural field radiance (NeRF) model, a neural surface reconstruction (NeuS) model, or the like.

The pixel reprojection module 225 may be designed, programmed, or otherwise configured to leverage depth information provided by the 3D representational model 220 along with known camera parameters, e.g., pose or position, to reproject points from one view to corresponding points in any adjacent view(s) through a reprojection function denoted as π. That is, the pixel reprojection module 225 is configured to reproject pixels across different image views using rendered depth values, e.g., NeRF-rendered depth values, to reproject a pixel position in different image views, which may have errors in the 3D image due to 3D image infidelities. As such, the reprojections of the pixels, e.g., reprojected correspondences, may be aligned to the cross-view correspondences, e.g., between the multi-view image(s) and the reprojected pixel(s), for example, by minimizing a cross-view correspondence loss between the multi-view images and the reprojected pixel(s), to enhance the image fidelity of the output image, e.g., by correcting or updating parameters in the 3D representational model 220, such as, depth parameters.

The correlation computation module 218 may be designed, programmed, or otherwise configured to compute cross-view correspondences between each image pair of adjacent views from image sets generated or rendered from the 3D representational model 220, yielding N sets of adjacent-view correspondences. In some embodiments, the cross-view correspondences may be determined from correlation map(s) generated from the one or more diffusion models 210A, 210B, in which the cross-view correspondences may be extracted, annotation-free corresponding points in each image pair of adjacent views. The correlation computation module 218 may be configured to provide post-processing of the correlation map(s) to result in better correspondences between pixels and/or points in the image pairs without any training.

The cross-view correspondence loss module 250 may be designed, programmed, or otherwise configured to determine a correspondence loss between reprojected points from the 3D representational model 220 and the cross-view correspondences from the at least one diffusion model determined by the correlation computation module 218 for supervising the 3D representational model 220. The cross-view correspondence loss module 250 may include an algorithm to determine the cross-view correspondence loss, which penalizes the reprojected correspondences, e.g., pixels or points, from the 3D representational module 220 when they diverge from the diffusion feature cross-view correspondences from the correlation computation module 218, e.g., when they are incoherent to common sense.

In some embodiments, the 3D representational model 220 may be optimized for 3D image rendering based on Score Distillation Sampling (SDS), which facilitates the optimization of differentiable image parameterizations (DIP) by using the one or more diffusion models 210A, 210B, 210C to compute gradients in the form of:

$$\nabla_\theta \mathcal{L}_{SDS}(\phi, x = g(\theta) \triangleq \mathbb{E}_{t,\epsilon}[w(t)(\epsilon_\phi(z_t; y, t) - \nabla_\theta x]$$

In this formula, $\theta$ denotes the parameters of the DIP, $\phi$ represents the parameters of the diffusion model, and x signifies the image rendered by the DIP through the function g. The term $w(t)$ is a weighting function dependent on the sampled timestep t. The variable e stands for the noise vector, and $z_t$ is the noisy image at timestep t. The expectation $\mathbb{E}$ is taken over both t and $\epsilon$, with y being the conditioning variable, such as a text prompt. This approach allows one or more of the diffusion models 210A, 210B, 210C to act as a 'frozen critic', e.g., for predicting image space modifications to optimize the DIP, such that zero-shot text-to-3D generation may be provided.

In some embodiments, since the one or more diffusion models 210A, 210B, 210C may be a multi-view diffusion model for providing multiple views as the output image, a multi-view diffusion loss for supervising the 3D representational model 220 may be provided for optimizing the 3D rendering of the image by the 3D representational model 220, as follows:

$$\mathcal{L}_{SDS(\phi, \{x_i = g(\phi, c_i)\}_{i=1}^N)} = \mathbb{E}_{t,c,\epsilon}\left[\sum_{i=1}^N \|x_i - \hat{x}_{0,i}\|^2\right]$$

In this formula, $c_i$ denotes the camera pose for the i-th view, $x_i$ is the image rendered from the 3D volume for the i-th view, and $\hat{x}_{0,i}$ is the corresponding image generated by the one or more diffusion models 210A, 210B, 210C, in which the diffusion model is frozen, e.g., parameters of the diffusion model are not changed or updated. As such, the 3D representational model 220 may have improved 3D consistency by using the multi-view diffusion models 210A, 210B, 210C, for example, to ensure that the rendered views of the 3D volume of the image by the 3D representational model 220 adhere to the same level of coherence, which may result in substantial improvements in the stability and quality of the text-to-3D generation, e.g., including mitigation of color saturation, improvements to surface textures, colors, concavities, quality, content drift, or the like.

Operation of the 3D generator model 200 is discussed further below, in which the 3D generator model 200 may have further improvement to the 3D image fidelity of zero-shot text-to-3D outputs, using cross-view correspondences derived from the multi-view diffusion models 210A, 210B that are used as priors for the 3D representational model. In some embodiments, the 3D representational model 220 may be optimized using both SDS loss and the cross-view correspondence loss to improve the 3D image fidelity of the 3D image, e.g., updating or correcting the parameters of the 3D representational model 220, such as, the depth parameter. For example, in some embodiments, the optimization of the 3D representational model 220 may include generating two adjacent sets of rendered views with minimally separated camera positions in azimuth using the 3D representational model 220; determining 2D features, e.g., from feature maps, of the rendered views, using the one or more diffusion models 210A, 210B; determining cross-view correspondences between adjacent rendered views; and updating the 3D representational model 120 to correct geometries via any cross-view correspondence loss (and/or SDS loss).

Initially, input data, such as a text prompt, may be provided to the 3D generator model 100 and/or one or more of the diffusion models 210A, 210B, 210C to generate an output image. The one or more diffusion models 210A, 210B, 210C may be designed, programmed, or otherwise configured to generate multiple 2D views, e.g., at various camera angles in a 3D space, for the resulting image (or scene) from the text prompt, in which the multiple 2D views may be used for rendering the 3D image, e.g., pre-trained multi-view diffusion models to generate a scene of the image corresponding to the text prompt. That is, in some embodiments, the multi-view diffusion models 210A, 210B, 210C, e.g., $\epsilon_\theta$, may be used to generate N images $$\{x_T^{(i)}\}_{i=1}^N,$$

where each image is a 2D image associated with a distinct viewpoint derived from the camera parameters and the given text prompt y, e.g., conditioning variable. The 2D images may represent a range of equispaced azimuth angles, capturing different perspectives of the same scene.

In some embodiments, the 3D representational model 220, e.g., a NeRF model φ, may be designed, programmed, or otherwise configured to generate and/or render the 3D image from the multi-view 2D images generated by the one or more diffusion models 210A, 210B, 210C, e.g., neural volumetric rendering of the multiple 2D images. In some embodiments, at a beginning or initial iteration, the 3D image may have 3D image infidelities.

In order to improve the 3D image fidelity of the resulting 3D image, the 3D representational model 220 may be optimized, e.g., by correcting or updating parameters in the 3D representational model 220, using one or more loss functions based on the resultants from the diffusion models 210. In some embodiments, the 3D representational model 220 may be optimized, e.g., by minimizing the $L_{SDS}$, by rendering N views $$\{g(\phi, c_i)\}_{i=1}^{N}$$

of image set 230, where $c_i$ defines the camera parameters corresponding to the i-th view, and g is a rendering function, e.g., a NeRF rendering function, dependent on the parameters of φ, e.g., as discussed above. Through this process, the 3D representational model 220 may be supervised, e.g., the model 220 may be optimized by returning the SDS loss 240, e.g., $L_{SDS}$, to the 3D representational model 220, until the images produced by the 3D representational model 220 are consistent with the specified perspectives of $c_i$, aligning the rendered views with predictions from the frozen diffusion model 210C, e.g., until the $L_{SDS}$ is minimized to a predetermined value.

In some embodiments, the 3D representational model 220 may be further optimized by minimizing the cross-view correspondence loss. In one embodiment, the 3D representational model 220 may use the cross-view correspondence loss as supervision, in which the cross-view correspondence loss may be used to penalize any disparity between reprojected correspondences from the 3D representational model 220, e.g., computed from depths and camera pose, when they diverge from the diffusion feature cross-view correspondences, e.g., when they are incoherent to common sense. That is, in some embodiments, the cross-view correspondences may be used as pseudo-ground truth correspondences, e.g., correspondences that are consistent with human perception and adheres to common sense for image rendering.

For example, in some embodiments, due to large azimuthal distances between each of the N views of images, for example, the images in image set 230, there may be limited viewpoint overlap between adjacent views, such that direct correspondence computation, e.g., cross-view correspondence, may be difficult and/or prone to error. As such, in some embodiments, the 3D representational model 220 may be used to render two interlinked image sets 230, 235 of N views, e.g., 4, 8, 12, 16, or the like, to determine any cross-view correspondences between image pairs, e.g., ensuring that each view in image set 230 has an adjacently rendered view in image set 235 thereby minimizing azimuthal separation. That is, the images from image set 230 are interlinked to have corresponding pixels or points in image set 235 such that at least some viewpoint overlap is provided at various angular increments. The azimuth angles for the two image sets 230, 235 may be articulated as $$\{\alpha_i\}_{i=1}^{N} \text{ and } \{\beta_i\}_{i=1}^{N},$$

where $\beta_i$ is defined as $\alpha_i + \Delta\alpha$, with $\Delta\alpha$ being a small, predetermined angular increment, e.g., between 5 and 15 degrees and/or between 1 and 30 degrees. In some embodiments, the N views may include the N views from image set 230, as discussed above, e.g., for minimizing the $L_{SDS}$, or different N views used for determining the cross-view correspondences alone.

The diffusion models 210A, 210B may be designed, programmed, or otherwise configured to respectively receive and process the images from the image sets 230, 235 to determine any cross-view correspondence between the image pairs in the respective image sets 230, 235, e.g., a diffusion model to process images from one of the image sets for feature extraction. In some embodiments, Gaussian noise y may be added to the rendered views in image sets 230, 235 from the 3D representational model 220, modulated by a timestep t, creating noisy images $$\bar{v}_t^{(i)} = v_t^{(i)} + \sqrt{\partial_t}\,\eta,$$

with η distributed as N(0,I), and $\partial_t$ being a variance schedule function of the timestep t, which controls the noise level. The diffusion models 210A, 210B, Ce, may then be configured to predict one or more noise components in the image(s) as:

$$\hat{\eta}^{(i)} = \epsilon_\theta\big(\bar{v}_t^{(i)};\, y,\, c_i,\, t\big)$$

It is understood that the one or more noise components may be the Gaussian noise and/or noise present in the images from the image sets 230, 235.

During the prediction of the one or more noise components, the diffusion models 210A, 210B may be designed, programmed, or otherwise configured to extract intermediate features $$\{f_l^{(i)}\}$$

from the one or more layers 215. In some embodiments, the one or more diffusion models 210A, 210B may include the one or more layers 215 that may be designed, programmed, or otherwise configured for segmenting the image(s) and/or generating feature maps of the image(s), e.g., via progressively lowering (e.g., halving) the feature map resolution and then increasing the resolution, e.g., a U-Net up-sampling layer, to extract the intermediate features across multiple layers of the one or more layers 215. The intermediate features may be expressed as:

$$f_l^{(i)} = U_l\big(\bar{v}_t^{(i)};\, \theta_l\big)$$

where $U_l$ is the up-sampling function at layer l, e.g., 215, and $\theta_l$ are the learned parameters specific to that layer 215. That is, during the up-sampling (and/or during the subsequent down-sampling) of the images to image view resolutions, the diffusion models 210A, 210B may be configured to extract intermediate features from multiple layers of the one or more layers 215 to generate feature maps from the one or more layers 215. In some embodiments, the extraction using the diffusion models 210A, 210B may yield a comprehensive set of features without additional training or explicit feature extraction algorithms. In some embodiments, the one or more diffusion models 210A, 210B may be frozen, such that the parameters of the one or more diffusion models 210A, 210B are not altered or changed during the supervision of the 3D representational model 220, e.g., to reduce the need for adjusting additional variables to optimize the model and the diffusion models may be used a critic and/or pseudo-ground truth data.

After obtaining the multi-view features for 2N views, $$\{f_l^{(i)}\}$$

and $$\{f_l^{(i+N)}\}$$

for i=1 to N, the correlation computation module 218 may be designed, programmed, or otherwise configured to compute cross-view correspondences between each image pair of adjacent views from the image sets 230, 235, yielding N sets of adjacent-view correspondences. In some embodiments, the feature maps extracted from the one or more layers 215 may possess varying spatial dimensions across the one or more layers 215, and, as such, may be interpolated to a common resolution H'×W', as follows:

$$f_l'^{(i)} = B(f_l^{(i)}, H', W'), f_l'^{(i+N)} = B(f_l^{(i+N)}, H', W')$$

where B represents the bilinear interpolation function.

In some embodiments, prior to computing a correlation map, the correlation computation module 218 may be configured to normalize the feature maps to ensure comparability. As such, the correlation computation module 218 may compute the correlation map $$C_l^{(i)}$$

at each feature level l to encapsulate pairwise similarity across all spatial positions, resulting in a 4D tensor with dimensions H'×W'×H'×W'. The element $$C_l^{(i)}(p, q, r, s)$$

represents the L2 distance (and/or cosine similarity between all possible pixel positions) between the vectors at positions (p, q) and (r, s) as follows:

$$C_l^{(i)}(p, q, r, s) = \frac{\left(f_l'^{(i)}(p, q) \cdot f_l'^{(i+N)}(r, s)\right)}{\left\|f_l'^{(i)}(p, q)\right\|_2 \left\|f_l'^{(i+N)}(r, s)\right\|_2}$$

Subsequently, in some embodiments, the correlation computation module 218 may aggregate the correlation maps from all feature levels to form the cumulative correspondence map C^{(i)} for each view i, which may be defined by the sum:

$$C^{(i)} = \sum_l C_l^{(i)},$$

Since the 4D correlation map C^{(i)} integrates the feature-level similarities into a singular comprehensive map, for each spatial location (p, q), correspondences may be determined by identifying the position(s) with the highest value in C^{(i)}, signifying the nearest neighbor:

$$corr(p, q) = \operatorname*{argmax}_{r,s} C^{(i)}(p, q, r, s),$$

where corr(p, q) designates the corresponding spatial location in the adjacent view for the point at (p, q). In some embodiments, for each pixel position in the source feature maps, the cross-view correspondences may be determined by the position in the target feature map with the highest cosine similarity. By having the dense correspondence field between each image pair, e.g., with adjacent views, the cross-view correspondence may serve as a 3D geometric prior and may be used to supervise the 3D representational model 220 to improve 3D fidelity, as discussed below. That is, since the ground-truth camera parameters are known for each rendered view, e.g., via the 3D representational model 220, any implausible correspondences may be filtered out, e.g., to adhere to constraints like the epipolar constraint.

In some embodiments, the correlation computation module 218 may be designed, programmed, or otherwise configured to post-process the cross-view correspondences to improve the cross-view correspondence determination. For example, in some embodiments, the correlation computation module 218 may be configured for filtering out by opacity, soft nearest neighbor filtering, 4D smoothing, using epipolar as a constraint, removing out-of-bound correspondence(s), determining correspondence(s) by having a highest similarity value in the correlation map, or the like, which may be used to result in better correspondences between pixels and/or points in the image pairs without any training.

Filtering out by opacity may include establishing correspondences only between the foreground objects, i.e., not the background. For example, in some embodiments, the NeRF opacity values may be used to filter out the background positions. The opacity value ranges from 0 to 1, where 0 signifies no occupancy (background) and values closer to 1 signifies high occupancy (likely to be foreground). As such, the background positions may be disregarded by filtering out pixel positions with opacity=0. Furthermore, it was observed that using the edge pixels (i.e., neighboring a background pixel) of the foreground object may result in unwanted artifacts near the edge of the object. Thus, considering that non-edge pixels of the foreground usually have an opacity value of >0.99, the edge pixels are additionally disregarded from the cross-view correspondence loss computation, e.g., by performing a 2D average pooling on the opacity map, and disregarding the pixels with opacity values less than the threshold value of 0.99. The filtering may be carried out for both the source and target images, where the predicted target pixel should also be within the non-edge foreground pixels of the rendered view.

Soft mutual nearest neighbors filtering may be used to facilitate the reciprocity constraint on matches. In some embodiments, given a correlation map $C^{(i)}$, the soft mutual nearest neighbor filtering $M(\cdot)$ may be used to yield a refined feature map $\hat{C}^{(i)} = M\,(C^{(i)})$, where $$\hat{C}^{(i)}(p, q, r, s) = r^{(i)}_{pqrs} r^{(i+N)}_{pqrs} C(p, q, r, s),$$

in which $$r^{(i)}_{pqrs}$$

and $$r^{(i+N)}_{pqrs}$$

are ratios of the score of the particular match $C^{(i)}(p, q, r, s)$ with the best scores along each pair of dimensions corresponding to the i-th and (i+N)th view respectively, as:

$$r^{(i)}_{pqrs} = \frac{C^{(i)}(p, q, r, s)}{\max\limits_{ab} C^{(i)}(a, b, r, s)}, \, r^{(i+N)}_{pqrs} = \frac{C^{(i)}(p, q, r, s)}{\max\limits_{cd} C^{(i)}(p, q, c, d)}$$

The 4D smoothing operation may be used on the correlation map for smoothing the 4D space of image correspondences, and for disambiguating correspondences with the help of neighboring matches. That is, it can be assumed that correct matches may have a coherent set of supporting them in the 4D space, especially when the two rendered views depict the same object but just from different azimuthal viewpoints. The 4D smoothing may then act as a soft spatial consensus constraint (4D convolution with $1/k^3$ uniform weight for each kernel position, instead of learnable weights) to avoid errors on ambiguous or textureless matches.

The multi-layer features may be used to leverage the multiple features that may be obtained along the varying depths of the up-sampling layers 215 of the diffusion models 210A, 210B. In some embodiments, features from multiple layers may be leveraged to exploit both the semantics/context and local patterns/geometries that are encoded in different layers. For example, in some embodiments, among 12 up-sampling layers 215 of the diffusion models 210A, 210B, features from the 6th and 9th up-sampling layers 215 may be leveraged with reasonable computation overhead.

In some embodiments, the epipolar constraint may be used to improve the cross-view correspondences. For example, in some embodiments, for each of the rendered views from the 3D representational model 220, ground-truth camera parameters may be known, specifically the extrinsic and intrinsic parameters. By using these parameters, the epipolar line on the target view corresponding to any pixel on the source view may be accurately determined. The epipolar constraint states that the true corresponding point of a point from the source view must lie on the epipolar line. Adhering to this constraint, in some embodiments, all predicted target points may be projected to their respective epipolar lines. In some embodiments, the projection distance to the epipolar line is calculated, in which any correspondence(s) whose projection distance to the epipolar line is larger than a pixel distance threshold $\tau_{epi}$ is discarded, e.g., $\tau_{epi} = 2$.

The out-of-bounds filtering may be used to filter out any predicted target points which fall out of the non-edge foreground pixels. Furthermore, in some embodiments, in calculating the $corr_{representational}$, e.g., from the reprojections, any reprojections may be filtered out if they fall out of the image bounds of H', W'.

The pixel reprojection module 225 may be used to leverage depth information along with known camera parameters provided by the 3D representational model 220 to reproject points or pixels from one view (of an image) to corresponding point(s) in any adjacent view image through a reprojection function denoted as $\pi$. As such, having established N sets of correspondences between adjacent rendered image pairs and having the known camera parameters and depth information, for each image pair of adjacent images, two distinct sets of correspondences may be obtained: one derived from the diffusion features, $corr_{diff}$, e.g., cross-view correspondence, and the other obtained via reprojection using camera parameters and rendered depths, $corr_{representational}$, e.g., reprojected correspondence. The pixel reprojection module 225 may include a reprojection function that is defined as:

$$corr_{representational}(p) = \pi\big(depth_\phi(p), c, p\big),$$

where $depth_\phi(p)$ is the depth value at pixel p, and c represents the camera parameters. In some embodiments, e.g., at initial iterations, the reprojections by the 3D representation model 220 may have 3D image infidelities, e.g., due to limited views for rendering the 3D image.

Using the $corr_{diff}$ and $corr_{representational}$, the cross-view correspondence loss module 250 may generate a cross-view correspondence loss 255 for supervising the 3D representational model 220. That is, since features derived by the one or more diffusion models 210A, 210B, e.g., diffusion features, may be both informative and discriminative, correspondences may be provided that not only associate semantically similar features but also adhere to geometric consistency, e.g., to align with human perceptual reasoning, such that the diffusion features may be used as pseudo-ground truth correspondence values. Thus, the cross-view correspondence loss module 250 may include an algorithm to determine the cross-view correspondence loss 255, which penalizes the reprojected correspondences from the 3D representational model 220 when they diverge from the diffusion feature correspondences, e.g., when they are incoherent to common sense, as follows:

$$\mathcal{L}_{corr} = \sum_p \omega(p) \cdot \text{Loss Function}(corr_{diff}(p), corr_{representational}(p))$$

Here, Loss Function($\cdot$) may represent a loss function, such as, the Huber loss function, e.g., a combination of mean squared error an mean absolute error loss functions, which may switch depending on the size of the error, and $\omega(p)$ is a weighting factor proportional to the similarity value at position p in the correlation map, enhancing the influence of high-confidence correspondences. As such, $\mathcal{L}_{corr}$ may be used to align the 3D representational model's 220 depth predictions with the geometrically and semantically robust correspondences derived from diffusion features, e.g., from the one or more diffusion models 210A, 210B, e.g., by adjusting or updating parameters of the 3D representational model 220. Thus, in some embodiments, $\mathcal{L}_{corr}$ may be used to correct infidelities in the rendered depths, e.g., in the 3D image rendered by the 3D representational model 220, and enhance the 3D representational model's 220 coherence to common sense.

Referring back to FIG. 2, the 3D representational model 220 may be optimized using both SDS loss 240 and the cross-view correspondence loss 255 to improve the 3D image fidelity of the 3D image, e.g., updating or correcting the parameters of the 3D representational model 220, such as, the depth parameter, as follows. In optimizing the 3D representational model 220, two distinct objectives may be considered: $\mathcal{L}_{SDS}$ 240, which ensures that rendered views are consistent with the pre-trained diffusion model, and $\mathcal{L}_{corr}$ 255, which improves the 3D fidelity of the inferred geometry. In some embodiments, the 3D representational model 220 may be optimized using an alternating optimization strategy in which the 3D representational model 220 is optimized alternately and iteratively using $\mathcal{L}_{SDS}$ and $\mathcal{L}_{corr}$, e.g., the 3D representational model 220 is optimized using $\mathcal{L}_{SDS}$ and/or the 3D representational model 220 is further optimized using $\mathcal{L}_{corr}$. It is understood that, as used herein, alternately may refer to a one-to-one iteration, one-to-two iteration, two-to-one iteration, or the like, and is not limited thereto.

In some embodiments, a total number of optimization iterations may be defined as T, with a predefined range [$t_{start}$, $t_{end}$] within which $\mathcal{L}_{corr}$ is active. In some embodiments, the SDS loss may be applied to the 3D representational model 220 at every iteration. However, for iterations t such that $t_{start} \leq t \leq t_{end}$ and t is even (t % 2=0), $\mathcal{L}_{corr}$ may be applied without $\mathcal{L}_{SDS}$. This alternating approach may leverage the strengths of both losses, and may facilitate a balanced optimization of the 3D representational model 220 that enhances both the visual coherence and 3D geometric fidelity of the rendered image or scenes.

Figure 3:
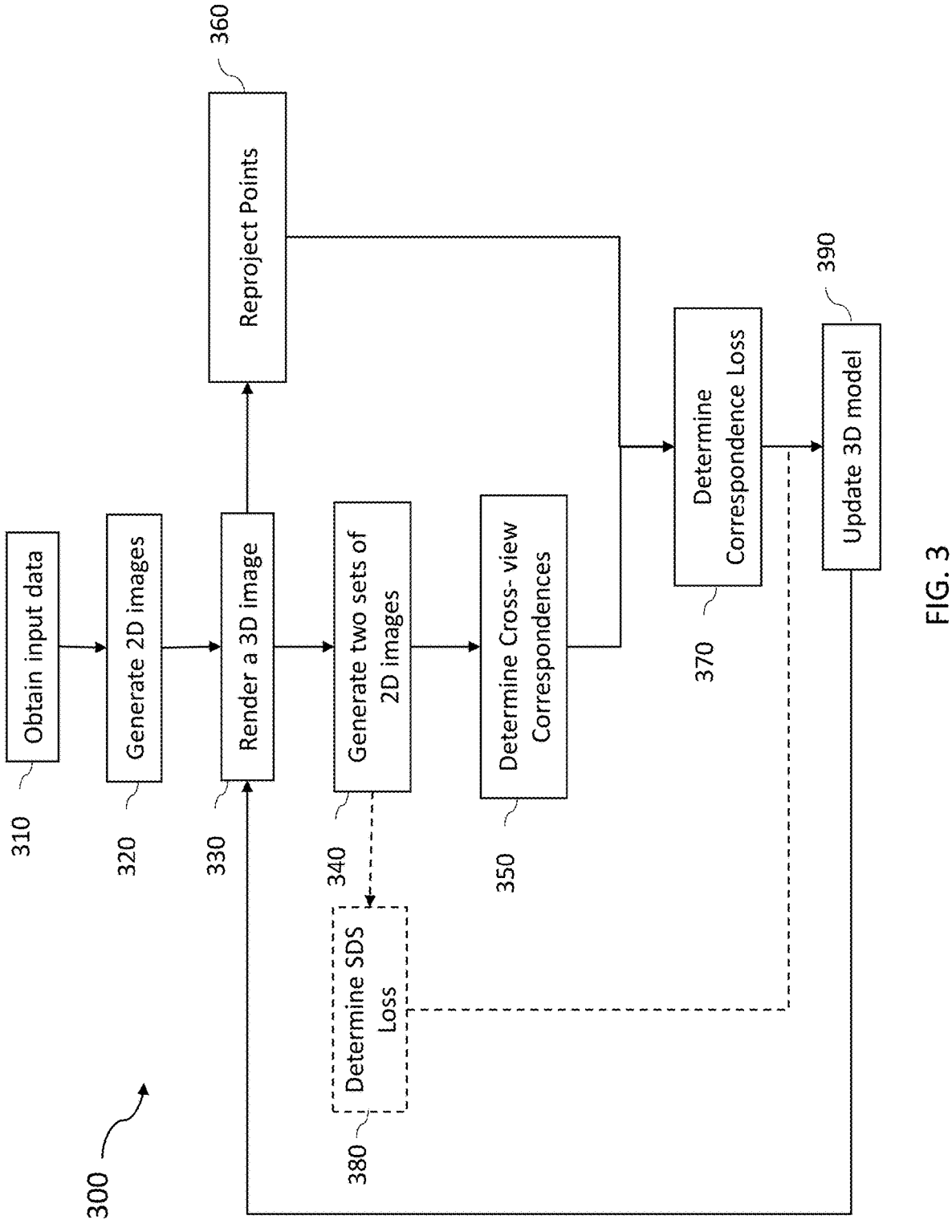
FIG. 3 illustrates a flow chart illustrating an example processing flow of a method for generating three-dimensional images, in accordance with at least some embodiments described herein.

FIG. 3 is a flow chart for generating a 3D image illustrating an example processing flow 300 of the three-dimensional generative model (e.g., 100 of FIG. 1 or 200 of FIG. 2), in accordance with at least some embodiments described herein.

It is to be understood that the processing flow 300 disclosed herein can be conducted by one or more processors (e.g., the central processor unit 405 of FIG. 4 and/or any other suitable processor), unless otherwise specified.

It is also to be understood that the processing flow 300 can include one or more operations, actions, or functions as illustrated by one or more of blocks 310, 320, 330, 340, 350, 360, 370, 380, and 390. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. As shown herein, the dotted lined blocks, e.g., 380, may be an optional step or block in the process flow and provided for illustrated purposes. Processing flow 300 may begin at block 310.

At block 310, (Obtain Input Data), input data, such as, a text prompt, may be provided to or obtained by the 3D generator model and/or to one or more of the diffusion models to generate an output image. The text prompt may include a desired or otherwise preferred prompt for the desired 3D image or scene, as well as other optional parameters including, but not limited to sampling types, output image dimensions, seed values, etc. For example, the text prompt may be "corgi wearing regalia," "cute steampunk elephant," "a chimpanzee with a big grin," "boy in Mohawk hairstyle, head only 4D, HD, raw," "an anthropomorphic tomato eating another tomato," or the like. Text prompt may be provided manually or automatically via a wired or wireless network. Processing flow 300 may proceed from block 310 to block 320.

At block 320, (Generate 2D images), the one or more diffusion models may be pre-trained multi-view diffusion models that are designed, programmed, or otherwise configured to generate multiple 2D views, e.g., at various camera angles in a 3D space, for the resulting image (or scene) from the text prompt, in which the multiple 2D views may be used for rendering the 3D image, e.g., pre-trained multi-view diffusion models to generate a scene of the image corresponding to the text prompt. Processing flow 300 may proceed from block 320 to block 330.

At block 330, (Render a 3D image), the 3D representational model may be designed, programmed, or otherwise configured to then generate and/or render the 3D image from the multiple views generated by the one or more diffusion models, e.g., using neural rendering and/or volumetric rendering functions. In some embodiments, the 3D image may have errors and/or inconsistencies, e.g., 3D image infidelities, in the rendered 3D image, e.g., such as surface textures, colors, concavities, quality, content drift, or the like at one or more depths of the 3D image. In order to improve the 3D image fidelity of the resulting 3D image, the 3D representational model may be optimized, e.g., by correcting or updating parameters in the 3D representational model, such as the depth parameter, using one or more loss functions based on the resultants from the diffusion models. Processing flow 300 may proceed from block 330 to block 340 and/or block 360.

At block 340, (Generate two sets of 2D images), the 3D representational model may be designed, programmed, or otherwise configured to generate and/or render at least two sets of 2D images that have adjacently rendered views, e.g., corresponding points in the images in the two sets of images, e.g., from different camera views or poses (or viewing angles). The 2D images may have any variety of pixel sizes, such as, 32×32, 64×64, 128×128, 256×256, or the like. Processing flow 300 may proceed from block 340 to block 350 and/or block 380.

At block 350, (Determine Cross-view correspondences), the one or more diffusion models may be designed, programmed, or otherwise configured to process the two sets of generated and/or rendered images from the 3D representational model to determine any cross-view correspondences between image pairs. In an embodiment, the one or more diffusion models may include one or more layers that may be up-sampling layers that may be designed, programmed, or otherwise configured for segmenting the image and/or generating feature maps of the images, e.g., via progressively lowering (e.g., halving) the feature map resolution and then increasing the resolution, for example, using the U-Net architecture. During the up-sampling (and/or during the subsequent down-sampling) of the images to image view resolutions, the diffusion models may be configured to extract intermediate features from multiple layers of the one or more layers to generate feature maps from the one or more layers that may possess varying spatial dimensions across one or more layers. In some embodiments, the one or more diffusion models may be frozen, such that the parameters of the one or more diffusion models are not altered, updated, or changed during the supervision of the 3D representational model, e.g., to act as a critic for the reprojected points, e.g., to provide pseudo-ground truth data. In some embodiments, the 3D generator model may be configured to compute correlation map(s) at each feature level from the feature maps from the one or more layers to encapsulate pairwise similarity across all spatial positions in the images from the at least two sets of images. The 3D generator model may then aggregate the correlation maps from all feature levels to form a cumulative correspondence map for each view (in the 3D space).

In some embodiments, the cross-view correspondences may be post-processed to improve the cross-view correspondence determination. For example, in some embodiments, filtering out by opacity, a soft nearest neighbor filtering, 4D smoothing, using epipolar as a constraint, removing out-of-bound correspondence(s), and determining correspondence(s) by having a highest similarity value in the correlation map may be used to result in better correspondences between pixels and/or points in the image pairs without any training.

By having the dense correspondence field between each image pair, e.g., with adjacent views, the 3D generator model may be configured to use the correspondence field as a 3D geometric prior to supervise the 3D representational model to improve 3D image fidelity. For example, cross-view correspondences may be computed from the correlation map(s) generated from the one or more diffusion models, in which the cross-view correspondences may be extracted, annotation-free corresponding points in each image pair of adjacent views. That is, annotation-free cross-view correspondences may be provided between each image pair of adjacent views from the image sets generated or rendered from the 3D representational model, yielding N sets of adjacent-view correspondences.

At block 360, (Reproject Points), the 3D representational model may be designed, programmed, or otherwise configured to reproject points or pixels across different image views using rendered depth values. In some embodiments, depth information provided by the 3D representational model along with known camera parameters, e.g., pose or position, may be leveraged to reproject points from one view to corresponding points in any adjacent view(s) through a reprojection function denoted as π. In some embodiments, the reprojected points or pixels may have image fidelities, e.g., at a beginning or an initial iteration of the 3D generator model. Processing flow 300 may proceed from blocks 350 and 360 to block 370.

At block 370, (Determine Correspondence Loss), a cross-view correspondence loss model may be designed, programmed, or otherwise configured to determine a correspondence loss between the reprojected points from the 3D representational model with the annotation-free cross-view correspondences from the at least one diffusion model determined for supervising the 3D representational model. The cross-view correspondence loss model may include an algorithm to determine the cross-view correspondence loss, which penalizes the reprojected correspondences, e.g., reprojected points or pixels based on camera pose and depth, from the 3D representational model when they diverge from the diffusion feature cross-view correspondences, e.g., when they are incoherent to common sense, e.g., the cross-view correspondences may be used as pseudo-ground truth data points. That is, since the ground-truth camera parameters may be a known parameter for each rendered view, e.g., via parameters provided by the 3D representational model, the reprojections of the points or pixels may be aligned to the cross-view correspondences, e.g., between the multi-view image(s) and the reprojected pixel(s), for example, by minimizing a cross-view correspondence loss between the multi-view images and the reprojected pixel(s), to enhance the image fidelity of the output image. Processing flow 300 may proceed from block 370 to block 390.

At block 390, (Update 3D Model), the 3D representational model may be designed, programmed, or otherwise configured to be updated by the determination from the cross-view correspondence loss model. In some embodiments, parameters of the model are updated, such as, the depth parameter. That is, the 3D representational model may use the cross-view correspondence loss as supervision, in which the cross-view correspondence loss may be used to penalize any disparity between reprojected correspondences, e.g., points or pixels, from the 3D representational model, e.g., computed from depths and camera pose, when they diverge from the diffusion feature cross-view correspondences, e.g., when they are incoherent to common sense. In some embodiments, the cross-view correspondences may be used as pseudo-ground truth correspondences, e.g., correspondences that are consistent with human perception and adheres to common sense for image rendering. In some embodiments, the processing flow 300 may include between 1,000 and 15,000 iterations or between 5,000 and 10,000 iterations until the cross-view correspondence loss is minimized, e.g., the disparity between projected points or pixels and the cross-view correspondences is minimized. As such, the resulting 3D image (or scene) from the text prompt may have improved 3D image fidelity, e.g., rendered surfaces, textures, colors, quality, concavities, or the like, without requiring extensive training to the model(s).

Optionally, processing flow 300 may include block 380 after block 340. At block 380, (Determine SDS Loss), the 3D generator model may be designed, programmed, or otherwise configured to determine SDS loss from at least one set of generated 2D images from the 3D representational model to ensure that the rendered views are consistent with a pre-trained diffusion model. In some embodiments, the SDS loss may be determined by rendering N views $$\{g(\phi, c_i)\}_{i=1}^{N}$$

of the image set, where $c_i$ defines the camera parameters corresponding to the i-th view, and g is a rendering function, e.g., a NeRF rendering function, dependent on the parameters of $\phi$, e.g., as discussed above. Processing flow 300 may proceed from block 380 to block 390. Through this process, at block 390, the 3D representational model may be further supervised by using the SDS loss, e.g., $L_{SDS}$, to optimize the 3D representational model, until the images produced by the 3D representational model are consistent with the specified perspectives of $c_i$, aligning the rendered views with predictions from the frozen diffusion model, e.g., until the $L_{SDS}$ is minimized to a predetermined value.

In some embodiments, blocks 370 (Determine Correspondence Loss) and 380 (Determine SDS Loss) may be iteratively and alternately performed to supervise the 3D representational model. It is understood that, as used herein, alternately may refer to a one-to-one iteration, one-to-two iteration, two-to-one iteration, or the like, and is not limited thereto. In some embodiments, a total number of optimization iterations may be defined as T, with a predefined range $[t_{start}, t_{end}]$ within which correspondence loss is active, e.g., being used. In some embodiments, the SDS loss may be applied to the 3D representational model 220 at every iteration. However, for iterations t such that $t_{start} \leq t \leq t_{end}$ and t is even (1% 2=0), correspondence loss may be applied without SDS loss. This alternating approach may leverage the strengths of both losses, and may facilitate a balanced optimization of the 3D representational model that enhances both the visual coherence and 3D geometric fidelity of the rendered image or scenes.

Figure 4:
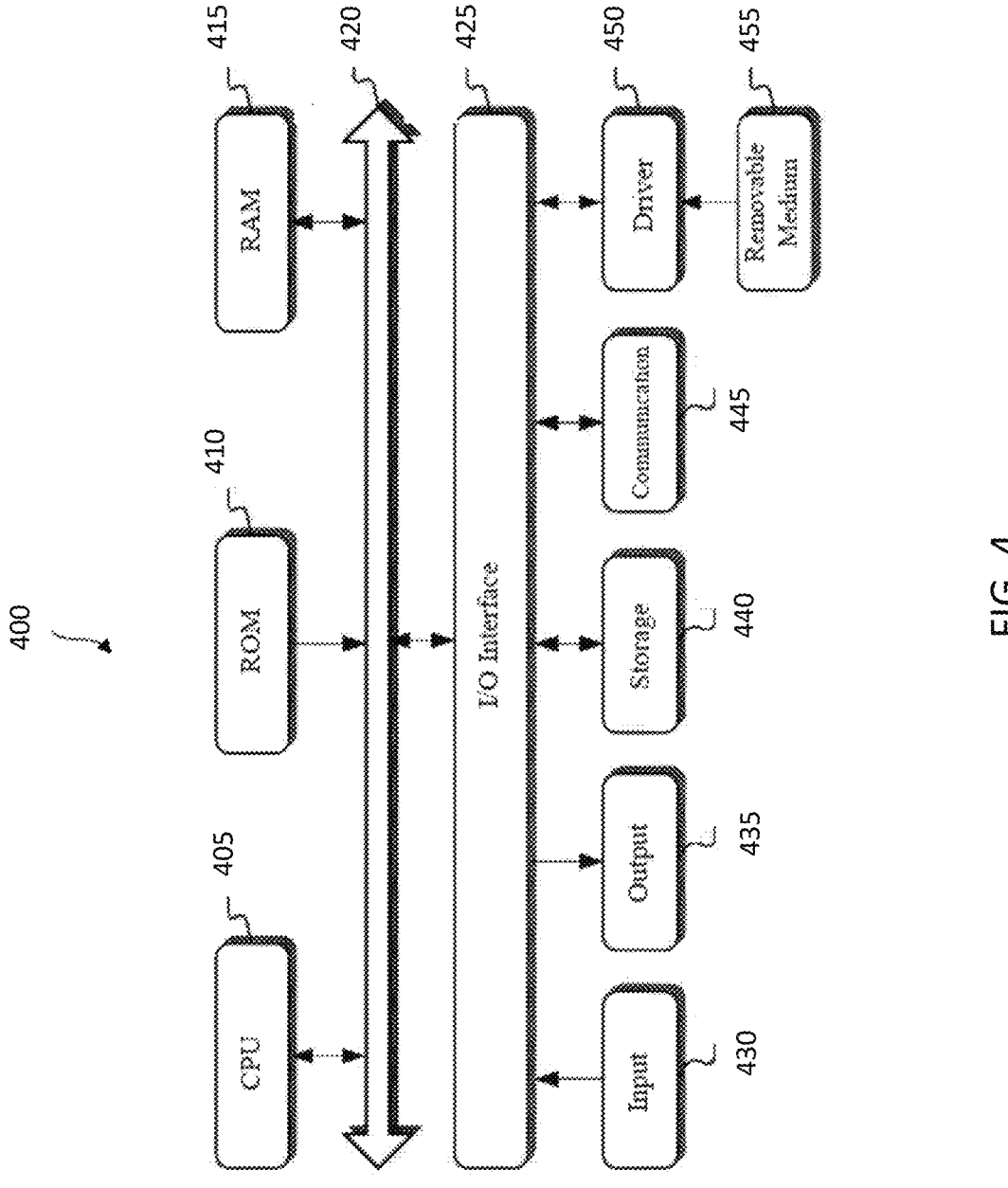
FIG. 4 is a schematic structural diagram of an example computer system applicable to implementing an electronic device, arranged in accordance with at least some embodiments described herein.

FIG. 4 is a schematic structural diagram of an example computer system 400 applicable to implementing an electronic device (for example, a GPU or CPU), arranged in accordance with at least some embodiments described herein. It is to be understood that the computer system shown in FIG. 4 is provided for illustration only instead of limiting the functions and applications of the embodiments described herein.

As depicted, the computer system 400 may include a central processing unit (CPU) 405. The CPU 405 may perform various operations and processing based on programs stored in a read-only memory (ROM) 410 or programs loaded from a storage device 440 to a random-access memory (RAM) 415. The RAM 415 may also store various data and programs required for operations of the system 400. The CPU 405, the ROM 410, and the RAM 415 may be connected to each other via a bus 420. An input/output (I/O) interface 425 may also be connected to the bus 420.

The components connected to the I/O interface 425 may further include an input device 430 including a keyboard, a mouse, a digital pen, a drawing pad, or the like; an output device 435 including a display such as a liquid crystal display (LCD), a speaker, or the like; a storage device 440 including a hard disk or the like; and a communication device 445 including a network interface card such as a LAN card, a modem, or the like. The communication device 445 may perform communication processing via a network such as the Internet, a WAN, a LAN, a LIN, a cloud, etc. In an embodiment, a driver 450 may also be connected to the I/O interface 425. A removable medium 455 such as a magnetic disk, an optical disk, a magneto-optical disk, a semiconductor memory, or the like may be mounted on the driver 450 as desired, such that a computer program read from the removable medium 455 may be installed in the storage device 440.

It is to be understood that the disclosed and other solutions, examples, embodiments, modules and the functional operations described in this document may be implemented in digital electronic circuitry, or in computer software, firmware, or hardware, including the structures disclosed in this document and their structural equivalents, or in combinations of one or more of them. The disclosed and other embodiments may be implemented as one or more computer program products, i.e., one or more modules of computer program instructions encoded on a non-volatile and/or non-transitory computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this document may be performed by one or more programmable processors executing one or more computer programs to perform functions by operating on input data and generating output. The processes and logic flows may also be performed by, and apparatus may also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; and magneto optical disks. The processor and the memory may be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects:

It is appreciated that any one of the aspects may be combined with each other.

Aspect 1. A method for generating a three-dimensional (3D) image using one or more diffusion models, the method comprising: obtaining input data into at least one diffusion model, wherein the input data includes a prompt for generating the 3D image; generating at least two sets of two-dimensional (2D) images from a 3D representational model that is configured to render the 3D image; determining a correspondence loss between reprojected points from the 3D representational model and cross-view correspondences from the at least one diffusion model; and updating the 3D representational model based on the correspondence loss.

Aspect 2. The method of Aspect 1, wherein the cross-view correspondences are determined between image pairs from the at least two sets of 2D images using the at least one diffusion model.

Aspect 3. The method of Aspect 2, wherein the reprojected points are reprojections from at least one image of the image pairs to a corresponding point in the other image of the image pairs based on the 3D representational model.

Aspect 4. The method of any of Aspects 1-3, wherein the input data is a text prompt.

Aspect 5. The method of any of Aspects 1-4, further comprising determining a set of features from the at least two sets of 2D images by: adding noise to the at least two sets of 2D images from the 3D representational model modulated by a timestep; and predicting at least one noise component using the at least one diffusion model.

Aspect 6. The method of Aspect 5, further comprising up-sampling the at least two sets of 2D images into one or more layers; and extracting the set of features from the at least two sets of 2D images across the one or more up-sampled layers.

Aspect 7. The method of Aspect 6, wherein the cross-view correspondences are determined between image pairs from the at least two sets of 2D images and wherein the cross-view correspondences between the image pairs are determined by: extracting feature maps from the at least one diffusion model, the feature maps having varying spatial dimensions across one or more layers; interpolating the feature maps across the one or more layers to a common resolution; and determining pairwise similarity across the spatial dimensions for the image pairs.

Aspect 8. The method of Aspect 7, further comprising normalizing the feature maps.

Aspect 9. The method of any of Aspects 7-8, further comprising computing a correlation map at each feature level using the determined pairwise similarity across the spatial dimensions; and aggregating the correlation map from all feature levels for one or more views of the 3D image.

Aspect 10. The method of Aspect 9, wherein for each spatial location, the cross-view correspondences are determined as positions with a highest value in the aggregated correlation map.

Aspect 11. The method of any of Aspects 1-10, wherein the reprojected points are based on camera parameters and rendered depths from the 3D representational model.

Aspect 12. The method of any of Aspects 1-11, further comprising updating the 3D representational model based on a multi-view diffusion loss.

Aspect 13. The method of Aspect 12, wherein the updating of the 3D representational model includes performing the updating based on the correspondence loss and the multi-view diffusion loss in an alternating and iterative manner.

Aspect 14. A three-dimensional (3D) image generator comprising: at least one diffusion model for generating one or more images based on received input data; and a 3D representational model for rendering a 3D image from the one or more images from the at least one diffusion model, wherein the 3D representational model is configured to generate at least two sets of two-dimensional (2D) images of the 3D image, and wherein the 3D representational model is updated based on a correspondence loss, wherein the correspondence loss is determined between reprojected points from the 3D representational model and cross-view correspondences from the at least one diffusion model.

Aspect 15. The 3D image generator of Aspect 14, wherein the cross-view correspondences are determined between image pairs from the at least two sets of 2D images using the at least one diffusion model.

Aspect 16. The 3D image generator of any of Aspects 14-15, wherein the at least one diffusion model includes one or more up-sampling layers and wherein the at least one diffusion model is configured to extract a set of features from the at least two sets of 2D images across the one or more up-sampling layers.

Aspect 17. The 3D image generator of any of Aspects 14-16, further comprising at least one second diffusion model, wherein the 3D representational model is updated based on a multi-view diffusion loss, wherein the multi-view diffusion loss is determined from a difference between images from one of the at least two sets of 2D images and images generated by the at least one second diffusion model.

Aspect 18. The 3D image generator of Aspect 17, wherein the 3D representational model is updated iteratively using the correspondence loss and the multi-view diffusion loss.

Aspect 19. A method for increasing image fidelity in a multi-dimensional (MD) image using one or more diffusion models, the method comprising: generating at least two sets of images based on a MD representational model that is configured to render the MD image; determining cross-view correspondences between adjacent views in image pairs from the at least two sets of images using at least one diffusion model; and updating parameters in the MD representational model based on the cross-view correspondences.

Aspect 20. The method of Aspect 19, further comprising determining a set of features from the at least two sets of images by: adding noise to the at least two sets of images from the MD representational model modulated by a timestep; and predicting at least one noise component using the at least one diffusion model.

Aspect 21. A non-transitory computer-readable medium having computer-executable instructions stored thereon that, upon execution, cause one or more processors to perform operations comprising: obtaining input data into at least one diffusion model, wherein the input data includes a prompt for generating the 3D image; generating at least two sets of two-dimensional (2D) images from a 3D representational model that is configured to render the 3D image; determining a correspondence loss between reprojected points from the 3D representational model with cross-view correspondences from the at least one diffusion model; and updating the 3D representational model based on the correspondence loss.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for generating a three-dimensional (3D) image using one or more diffusion models, the method comprising:

obtaining input data into at least one diffusion model, wherein the input data includes a prompt for generating the 3D image;

generating at least two sets of two-dimensional (2D) images from a 3D representational model that is configured to render the 3D image;

determining a correspondence loss between reprojected points from the 3D representational model and cross-view correspondences from the at least one diffusion model, wherein the cross-view correspondences are determined between image pairs from the at least two sets of 2D images based on feature maps from the at least one diffusion model, and the reprojected points are reprojections from at least one image of the image pairs to a corresponding point in the other image of the image pairs based on the 3D representational model; and updating the 3D representational model based on the correspondence loss.

2. The method of claim 1, wherein the input data is a text prompt.

3. The method of claim 1, further comprising determining a set of features from the at least two sets of 2D images by:

adding noise to the at least two sets of 2D images from the 3D representational model modulated by a timestep; and predicting at least one noise component using the at least one diffusion model.

4. The method of claim 3, further comprising up-sampling the at least two sets of 2D images into one or more up-sampled layers; and extracting the set of features from the at least two sets of 2D images across the one or more up-sampled layers.

5. The method of claim 4, wherein the cross-view correspondences between the image pairs are determined by:

extracting the feature maps from the at least one diffusion model, the feature maps having varying spatial dimensions across one or more layers;

interpolating the feature maps across the one or more layers to a common resolution; and determining pairwise similarity across the spatial dimensions for the image pairs.

6. The method of claim 5, further comprising normalizing the feature maps.

7. The method of claim 5, further comprising computing a correlation map at each feature level using the determined pairwise similarity across the spatial dimensions;

and aggregating the correlation map from all feature levels for one or more views of the 3D image.

8. The method of claim 7, wherein for each spatial location, the cross-view correspondences are determined as positions with a highest value in the aggregated correlation map.

9. The method of claim 1, wherein the reprojected points are based on camera parameters and rendered depths from the 3D representational model.

10. The method of claim 1, further comprising updating the 3D representational model based on a multi-view diffusion loss.

11. The method of claim 10, wherein the updating of the 3D representational model includes performing the updating based on the correspondence loss and the multi-view diffusion loss in an alternating and iterative manner.

12. A three-dimensional (3D) image generator system, the system comprising:

one or more processors and one or more memories storing executable models, the executable models comprising:

at least one diffusion model for generating one or more images based on received input data; and a 3D representational model for rendering a 3D image from the one or more images from the at least one diffusion model, wherein the 3D representational model is configured to generate at least two sets of two-dimensional (2D) images of the 3D image, and wherein the 3D representational model is updated based on a correspondence loss, wherein the correspondence loss is determined between reprojected points from the 3D representational model and cross-view correspondences from the at least one diffusion model, wherein the cross-view correspondences are determined between image pairs from the at least two sets of 2D images based on feature maps of the at least one diffusion model, and the reprojected points are reprojections from at least one image of the image pairs to a corresponding point in the other image of the image pairs based on the 3D representational model.

13. The 3D image generator system of claim 12, wherein the at least one diffusion model includes one or more up-sampling layers and wherein the at least one diffusion model is configured to extract a set of features from the at least two sets of 2D images across the one or more up-sampling layers.

14. The 3D image generator system of claim 12, further comprising at least one second diffusion model, wherein the 3D representational model is updated based on a multi-view diffusion loss, wherein the multi-view diffusion loss is determined from a difference between images from one of the at least two sets of 2D images and images generated by the at least one second diffusion model.

15. The 3D image generator system of claim 14, wherein the 3D representational model is updated iteratively using the correspondence loss and the multi-view diffusion loss.

16. A method for increasing image fidelity in a multi-dimensional (MD) image using one or more diffusion models, the method comprising:

generating at least two sets of images based on a MD representational model that is configured to render the MD image;

determining a correspondence loss between reprojected points from a 3D representational model and cross-view correspondences from at least one diffusion model, wherein the cross-view correspondences are determined between image pairs from the at least two sets of 2D images based on feature maps from the at least one diffusion model, and the reprojected points are reprojections from at least one image of the image pairs to a corresponding point in the other image of the image pairs based on the 3D representational model; and updating parameters in the MD representational model based on the correspondence loss.

17. The method of claim 16, further comprising determining a set of features from the at least two sets of images by:

adding noise to the at least two sets of images from the MD representational model modulated by a timestep; and predicting at least one noise component using the at least one diffusion model.

* * * * *